(12) United States Patent
James et al.

(10) Patent No.: US 6,742,161 B1
(45) Date of Patent: May 25, 2004

(54) DISTRIBUTED COMPUTING DOCUMENT RECOGNITION AND PROCESSING

(75) Inventors: Barnaby James, Los Gatos, CA (US); Su Chen, San Jose, CA (US)

(73) Assignee: ScanSoft, Inc., Peabody, MA (US)

( * ) Notice: Subject to any disclaimer, the term of this patent is extended or adjusted under 35 U.S.C. 154(b) by 264 days.

(21) Appl. No.: 09/520,892

(22) Filed: Mar. 7, 2000

(51) Int. Cl.[7] .............................................. G06F 17/21
(52) U.S. Cl. ...................................... 715/500; 715/530
(58) Field of Search ............................... 707/500, 501, 707/513, 530; 704/1; 715/500, 501.1, 513, 530

(56) References Cited

U.S. PATENT DOCUMENTS

| | | | |
|---|---|---|---|
| 5,031,223 A | * 7/1991 | Rosenbaum et al. | 382/1 |
| 5,175,684 A | * 12/1992 | Chong | 704/3 |
| 5,218,458 A | * 6/1993 | Kochis et al. | 358/448 |
| 5,659,164 A | * 8/1997 | Schmid et al. | 235/375 |
| 5,701,497 A | * 12/1997 | Yamauchi et al. | 704/3 |
| 5,963,966 A | * 10/1999 | Mitchell et al. | 707/513 |
| 6,130,917 A | 10/2000 | Monroe | |

OTHER PUBLICATIONS

White paper entitled "Distributed Computing Document Recognition and Processing"; published on the Internet prior to Mar. 7, 2000.

Copy of International Search Report Mailed May 1, 2001.

* cited by examiner

Primary Examiner—Stephen S. Hong
(74) Attorney, Agent, or Firm—Bromberg & Sunstein LLP

(57) ABSTRACT

The present invention is a system and method for performing document recognition and processing in a distributed computing environment. The invention uses applications which are remotely located from one or more users and may be accessed via a network. One or more users utilize terminals including computers, facsimile machines, and/or scanners to transmit documents to be processed to a network or a network server which in turn transmits the documents to various computer software applications which process the documents at a network processing location. Once the documents have been processed, the processed documents are transmitted to the users according to one or more preferences associated with a user identification and/or authentication which may be determined by either a network server or an application server. Users utilizing a computer terminal make use of various data transfer programs capable of transferring document data over a network to an application server at a remote location and receiving processed document data via a network.

65 Claims, 2 Drawing Sheets

DISTRIBUTED COMPUTING DOCUMENT RECOGNITION AND PROCESSING

FIELD OF THE INVENTION

The present invention relates generally to document image processing in a distributed computing environment. More specifically, the present invention relates to optical character recognition and document conversion in a distributed computing environment such as a network environment, and routing processed computer documents to a user by way of a variety of electronic computing devices and/or networks.

BACKGROUND OF THE INVENTION

Traditionally, businesses have used paper documents to transfer information, store files, and communicate with clients. As technology has increased, many documents originate on a computer, and may be transferred to paper by way of a printer, or may be transferred electronically by way of a computer network. With increased computing power, integration of paper documents with electronic documents has become increasingly common. Currently, documents may be electronically transferred from computer to computer using a network protocol, such as e-mail. Another alternative is to transfer files from one computer to another by printing a document using a first computer and scanning that printed document using a scanning device connected to a second computer. In this manner, the second computer electronically stores an image of the scanned document.

In order to aid the translation of paper documents into electronic documents, document processing programs such as Optical Character Recognition (OCR) programs have been introduced to process documents by recognizing typeface characters within a scanned document image. This procedure is known as textual processing, which deals with the text components of a document image. Textual processing typically determines the skew, or tilt at which the document may have been scanned into the computer and finds columns, paragraphs, text lines, and words. Graphics processing, on the other hand, deals with graphics of a document image, or non-textual components determining line size, thickness, and direction, and the existence of corners and curves.

The conversion of a paper document into an electronic format, such as a word processing document, involves both hardware and software components. The hardware component, such as a scanner, determines the image of the document, and stores this image in electronic form, such as a bitmap. The software component analyzes patterns within the electronic image to recognize the content of the image, e.g., characters of text, lines, etc. In many instances, a person who desires to convert a paper document into an electronic format may not have access to one or both of these components. For instance, a person who is traveling may not have a scanner and OCR software available at a hotel. Similarly, for space and/or budgeting reasons, it may not be feasible to procure a scanner for home or small office use. In another example, a person may need access to a special type of OCR software, such as one which recognizes handwriting, or text in a foreign language. It is desirable, therefore, to provide a mechanism for converting documents into a desired electronic format in those situations where the required hardware and/or software components are not available to the user.

It is becoming increasingly common to distribute computing applications over a network, especially over the Internet. This is desirable due to the increasing cost of applications, and the speed with which newer versions of software applications are released. By maintaining applications at a location remote from a user, a user is not responsible for updating and maintaining current the software applications to be used. Also, as computers are improved and become rapidly outdated, it is desirable to maintain computer application files at a central location, thereby preventing the user from needing to reload all of the software applications which he or she uses upon purchasing a new computer. Additionally, distributed computing provides a user with an increased ease of installation as there is less software to install at the user's end, and software that is installed on a user's computer is generally smaller, requiring less memory space. Distributed computing also allows for a reduced cost to each user while providing more computational power for the software applications.

With the increasing availability and use of centralized computing applications, distributed computing document recognition and processing computer applications offer a solution to the needs described previously. In this regard, centralized fax services have been created which permit anyone to send a facsimile to a user, by means of a phone number assigned to that user, and routes the facsimile to the user, for instance via e-mail. Examples of such services include eFax, Kofax, and ThruFax. While these services provide basic, unilateral document processing, do not allow for a user to participate in a two-way exchange of documents, and provide only a limited number of possibilities for the submission and retrieval of documents. For example, eFax allows for incoming faxes to be processed using OCR processing, but does not allow for customization such as users settings and preferences, or specific routing, as routing is handled by direct inward dialing, where an individual must know the number to which he or she desires a transmission to be routed. Kofax provides a general distributed capture application for submitting documents to a central server, which may include certain document processing functions. However, the document submission in the Kofax application is limited to uni-directional data transfer. ThruFax provides a general fax server with limited routing technology.

Accordingly, it is desirable to create a system and method that allow a user to submit documents using a variety of interfaces to a remotely located computer application, with which will process the document and return a converted product to a user via a variety of different methods over a computer network. In so doing, it is also desirable to provide a computer user with a variety of convenient, familiar methods by which he or she may interface with the remotely located computer application. It is also desirable to determine a user's preferences for processing the document and use these preferences as guidelines when processing the documents. Additionally, it is desirable to provide for a method of authentication, whereby a user's identification may be verified and a method of transmitting a processed document to a user may be determined.

SUMMARY OF THE INVENTION

In accordance with the present invention, these objectives are achieved by a system and method that provides a user with access to a distributed computing document recognition and processing applications over a network. This system and method allow a user to employ the functionality of a remotely located application for document processing by submitting a document using a variety of sources and receiving a processed document product by a variety of different techniques. Also in accordance with the present invention, the system and method of the present invention allow for authentication of a user and document processing according to a user's predetermined preferences.

Further features of the invention and advantages offered thereby are explained in greater detail hereinafter with reference to specific embodiments illustrated in the accompanying drawings.

DETAILED DESCRIPTION OF THE PREFERRED EMBODIMENTS

To facilitate an understanding of the principles and features of the present invention, it is explained hereinafter with reference to its implementation in an illustrative embodiment. In particular, the invention is described in the context of software that performs optical character recognition (OCR) processing, logical structural recognition (LSR) processing, handwriting recognition processing, rendering functions, and other document processing on an electronic document, at a network processing location. The electronic document may be loaded into a user's computer from a variety of peripheral devices including a computer memory device or a peripheral scanning device, and subsequently delivers a processed document to the user by way of various network pathways. It will be appreciated, however, that this is not the only embodiment in which the invention can be implemented. Rather, it can find utility in a variety of computer configurations as will become apparent from an understanding of the principles upon which the invention is based. For example, a document may be submitted for processing in a distributed computing network by way of other user terminals, such as a facsimile machine, or other suitable device. Also, electronic documents can be converted from one format to another in a distributed computing environment.

Figure 1:
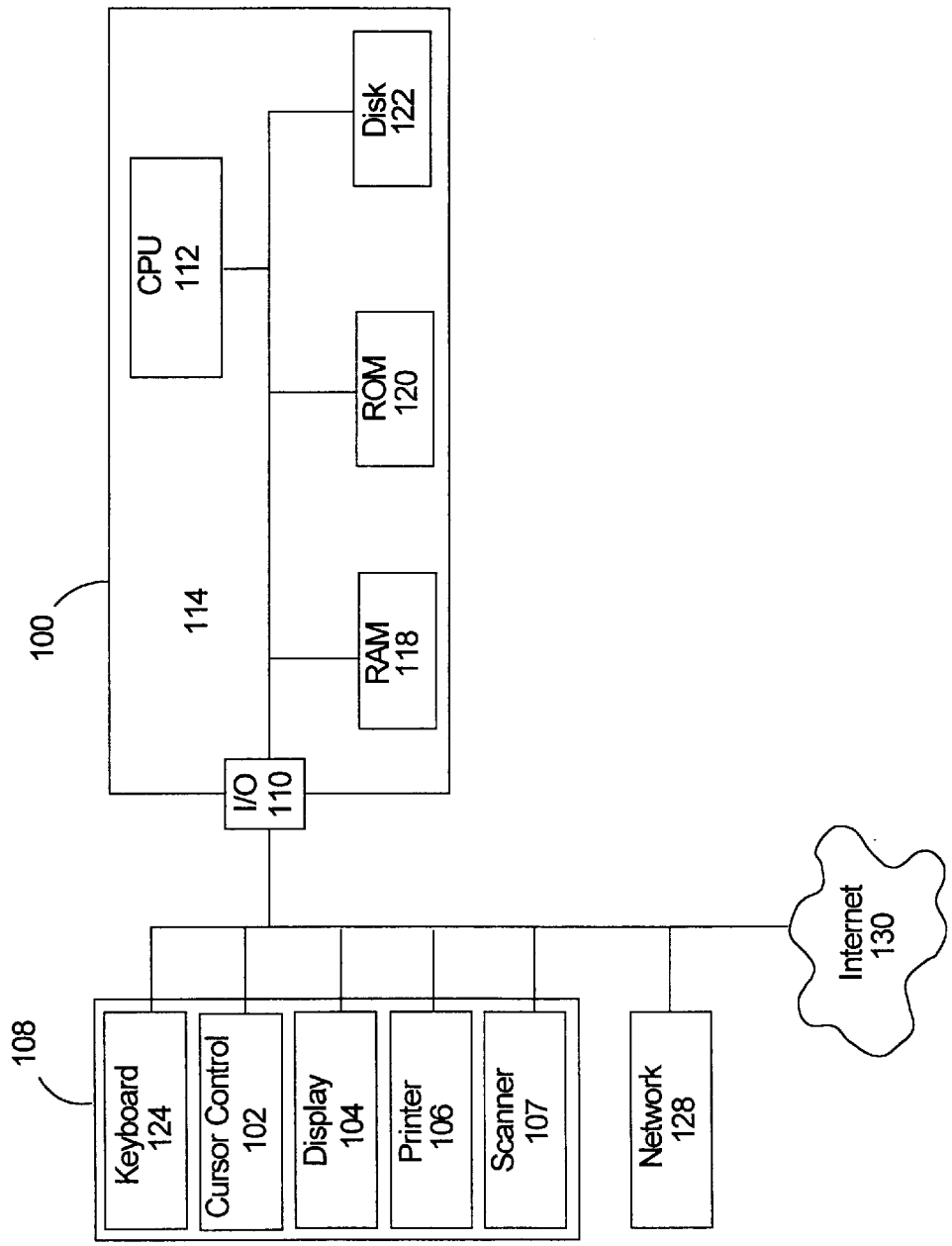
FIG. 1 is an exemplary computer system in which the system and method of the present invention may be employed.

An exemplary computer system of the type in which one embodiment of the present invention can be employed is illustrated in block diagram form in FIG. 1. The structure of the computer itself does not form part of the present invention. It is briefly described here for subsequent understanding of the manner in which the features of the invention cooperate with the structure of the computer.

Referring to FIG. 1, the computer system includes a computer 100 having a variety of peripheral devices 108 connected thereto. The computer 100 includes a central processing unit 112, a main memory which is typically implemented in the form of a random access memory (RAM) 118, a static memory that can comprise a read only memory (ROM) 120, and a permanent storage device, such as a magnetic or optical disk 122. The CPU 112 communicates with each of these forms of memory through an internal bus 114. The peripheral devices 108 include a data entry device, such as a keyboard 124, and a pointing or cursor control device 102, such as a mouse, trackball, or the like. A display device 104, such as CRT monitor or an LCD screen, provides a visual display of the information that is being processed within the computer, such as the contents of a document. A hard copy of this information can be provided through printer 106, or similar device. Hard copies of documents from other sources can be scanned into the computer to form a document image by way of a scanning device 107, such as a scanner or digital camera. Each of these external peripheral devices communicates with CPU 112 by way of one or more input/output ports 110 on the computer. The input/output ports 110 also allow the computer 100 to interact with an external network 128, such as a local area network (LAN), a wide area network (WAN), a virtual private network (VPN) or the Internet 130.

Computer 100 typically includes an operating system, which controls the allocation and usage of the hardware resources such as memory, central processing unit time, disk space, and peripheral devices. In addition to an operating system, computer 100 may also execute a variety of software applications, thereby adding functionality available to the computer user. Computer software applications may reside as a component of the operating system, or may be stored in memory or on any type of machine readable medium, such as disk 122. Examples of such applications include an Internet web browser and an e-mail program. Computer software applications may also reside at a central location, which is remote from the user's computer 100, and may be accessed and utilized via a network 128 or the Internet 130.

Figure 2:
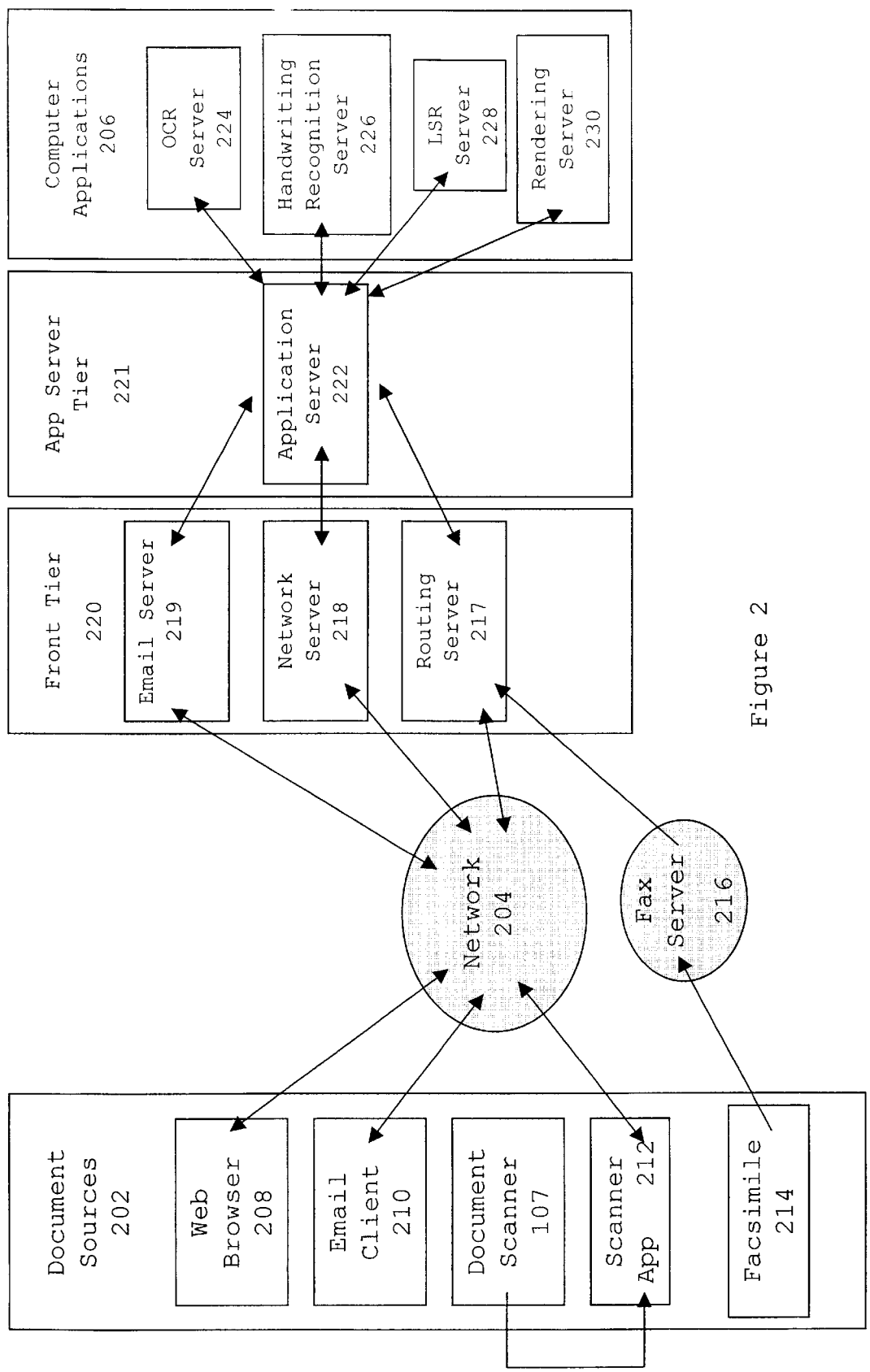
FIG. 2 is a block diagram of the system of the present invention.

In FIG. 2, the system of the present invention is illustrated in block diagram form. In this system, various document sources 202, which may be implemented on a user terminal or computer, such as the one illustrated in FIG. 1, communicate via a network 204 to access various computer software applications 206 located at a network processing location or locations. In one embodiment of the present invention, it is desirable for a user at a computer terminal, such as the computer illustrated in FIG. 1, to be able to submit an electronic document for remote processing via the network 204 by one or more computer software applications 206 which are located at a processing location, which may be remote from the user's computer. One type of processing which may be desired by the user is remote OCR processing over an electronic network. For example, the user may have received an image file, such as an electronic version of a facsimile, and desires to convert it into a text file to edit in a word processing application. The illustrated system enables a user to submit a document from his or her terminal via the network 204 and have one or more computer software applications 206 perform the desired functionality at a remote location.

In the OCR processing embodiment, for example, various source programs may be used to submit a document for recognition. One example is a web browser 208, which may be used to submit a document for processing and to receive a processed document, as indicated by the bidirectional arrow between the web browser 208 and the network 204. The web browser 208 connects the user's computer to an Internet site associated with the remote processing capabilities. This site transmits a web page to the browser, which displays a suitable window or text entry box via which the user can identify a file to submit for processing using traditional Hypertext Transfer Protocol (HTTP), for example, and by using a TCP/IP connection to either a network such as a LAN, WAN, VPN, or the Internet. It will be appreciated by those skilled in the art that the network 204 may comprise any of the aforementioned networks, or may encompass any similar networks which utilize various data transfer protocols suitable to transfer document data between two or more computers.

If the document to be transmitted to the remote processing site 206 is a paper document, it will need to be scanned into an electronic file before transmission, for example by using the scanner 107. To facilitate such an operation, it may be desirable to incorporate scanner controls within the browser, which may be displayed as buttons within the browser window. The function and purpose of such scanner controls are described hereinafter.

Once the document has been processed by the one or more computer software applications 206, it is placed at a designated location that is accessible by the user, for example, by connecting to a network server. Preferably, a notification is also sent to the user that the processing is complete and, if appropriate, the location of the document. For instance, the notification could be sent by an e-mail message. In addition to notification, a processed document itself can be sent to the user via e-mail, as text or an attachment, for example. If the processed document is placed at a designated web site, it may be collected by way of the web browser 208, utilizing the transfer protocols used by the network 204. It will be appreciated by those skilled in the art that the web browser 208 may be any computer software capable of browsing a network, such as the Internet, and transferring data over the network. A web browser 208 may take on a variety of different forms, all of which are suitable for the purposes of the present invention in allowing transfer of a document over a network utilizing a specific network protocol.

Another program document source 202 which may be used in submitting an electronic document for processing and receiving a processed document is an e-mail application or client 210. As will be appreciated by those skilled in the art, an e-mail application 210 may include a variety of different messaging applications which are suitable for transferring messages and data over a network using an associated data transfer protocol. Traditionally, e-mail uses a series of protocols such as Simple Mail Transfer Protocol (SMTP), Post Office Protocol (POP), Internet Message Access Protocol (IMAP), and various other protocols. It will be recognized by those skilled in the art that the e-mail application 210 may utilize any suitable transfer protocol for transferring message and data information, such as an e-mail attachment, over a network. A user may submit a document to be processed, via the network 204 and receive from the network 204 notification that the document has been processed and/or the processed document itself, as illustrated by the bi-directional arrow between the e-mail application 210 and the network 204.

Another source 202 which may be utilized to submit a document for processing to the network 204 is a scanner interface application 212. The scanner interface application 212 is a software application which resides on the user's computer and provides the user with a method for automatically scanning and uploading document images in a format suited for the particular processing which is desired by the user from the computer software applications 206, such as OCR processing. This interface software may form part of a larger program, such as a word processing program or the like, or may be a stand-alone application which allows a user to access document processing applications over the Internet upon scanning of a document either by a peripheral scanner 107, or by using other file types which are suitable for document processing, such as Tiff, Jpeg, Gif or Pict, or similar files. As noted previously, the function of the scanner interface application 212 may also be embedded within the web browser, for example. A user may start the interface program 212 by scanning a document with a peripheral scanner, and the program 212, upon receiving notification that a particular type of document processing is desired, may connect to the network 204 to transfer the scanned documents to be processed.

One advantage of utilizing the interface program 212 is that the document images which are created by the scanner 107 are formatted such that they are suitable for the particular type of document processing which is desired. For example, if an OCR function is desired, the interface program 212 controls the scanner to set the appropriate resolution, darkness, contrast, and other variables in order to achieve optimal OCR results. The interface program may also be configured such that once a user has scanned in all pages of a document image, he or she may submit the document along with an authentication string, which authenticates the user and identifies a return address for delivering the processed documents. The user identification could be stored within the scanner interface application 212 as a configuration setting, or the application may require the user to enter an identification when a document is submitted. In the case of a workgroup scanner, the interface application can recognize the user's log-in identification, and use that to retrieve and provide the appropriate authentification data for that user. It will be recognized by those skilled in the art that a user may further set various preferences in an interface program 212 such as preferred languages, accuracy levels, return delivery methods, email addresses, DNS addresses, output styles, output formats, or other variables desired by the user.

Another document source 202 which may be used to submit documents to be processed by the computer software applications 206 is a facsimile machine 214. When a facsimile machine 214 is employed to submit a document to be processed, some intermediate processing is required at the receiving end of the facsimile transmission to correctly route the document. This intermediate processing is performed by a fax server 216. The fax server 216 allows a user to transmit a facsimile image of a document to one or more designated telephone numbers via a facsimile machine 214. Once the fax server 216 has received the electronic document, it then transmits the document to a routing server 217 for further routing for later processing. The fax server 216 may be configured to detect the source of a document, and user authentication information. The source of a document may be detected, for example, from a caller ID, a facsimile ID string, a barcode on a facsimile cover sheet, information gathered by performing OCR processing on a facsimile cover sheet, or other such similar identification methods. Once the document source has been identified, user authentication data is added to the document data, which may be transmitted to or from an application server 222 using the protocol native to the network 204, so that the user may receive the processed document according to his or her preset preferences. It will be recognized by those skilled in the art that the technique for identifying the source of the document which has been received by the fax server 216 may take place in a variety of manners, which allow the fax server 216 to correctly identify a user and further allow computer software applications to perform according to the users' predetermined preferences.

The network server 218 forms part of the front tier 220, and is used as a traditional network server to and from the network 204 utilizing the network protocol native to the network. The network server 218 is also connected to an application server 222 in the application server tier 221, which contains job processing logic and a database containing various user information such as profiles and preference settings, and transfers data to and from the application server. Examples of profile and preference setting information that may be contained in the database on the application server 222 include language, output formats, output styles, method of transmission for processed documents, job information, network usage information, or other such information. The application server 222 may also be connected to an e-mail server 219, which also forms part of the front tier 220, and is configured to transmit e-mail messages to a user via the network 204 to be received by the user's e-mail application 210.

The application server 222 also has two-way connections with various individual servers which operate to perform various processing functions on the documents submitted by the user, using computer software applications 206. Each server can be configured to perform a variety of different software applications, or could have a specific application running on it, in a manner such that each application resides on a separate server, or group of servers. Individual application servers request jobs from a job queue maintained on the application server 222 as they finish all of their current jobs, or as their workload falls below a specified workload threshold. Such a workload threshold may be set by a network administrator, or other person.

Alternatively, the application server 222 could be configured to monitor the workload of each of the individual application servers and distribute work among the servers in a manner such as to maximize the efficiency of the document processing and minimize the return time to the user. It will be recognized by those skilled in the art that the application server 222 may incorporate various other functions and processing functionality which would be common to application servers in communicating between a network and various computer applications.

The computer software applications 206, which are located at a network processing location, remote from the user, may include a plurality of different applications desirable to be used in a distributed computing environment by multiple users. In one embodiment of the present invention, as has been discussed, OCR processing may be desired and achieved using this distributed computing environment. OCR processing may be accomplished using one or more OCR servers 224 which access various OCR applications on one or more computers in a manner to provide maximum efficiency in processing documents and a minimum return time to the user. However, it will be recognized by those skilled in the art that other types of document processing may be desired and utilized in the distributed computing environment of the present invention.

For example, a handwriting recognition program may be desired and implemented using a handwriting recognition server 226 which allows for a document containing handwriting samples to be processed and recognized by one or more handwriting recognition applications running on one or more computers. Also, a logical structure recognition (LSR) server 228 may be used to provide logical structure recognition processing of a document submitted by a user. The LSR server 228 accesses one or more LSR applications on one more computers. Additionally, a rendering server 230 may be used to provide rendering-type processing to a document submitted by a user by accessing one or more rendering applications on one or more computers. This may include, for example, rendering from a document image submitted by a user into a dynamic document in a particular format such as markup language documents, e.g., HTML documents, or the like. In addition to the servers and applications shown in FIG. 2, other applications may be utilized with the system depicted in FIG. 2, residing on additional servers, or groups of servers. For example, a bar code or UPC application could be incorporated in the system shown in FIG. 2. Such a bar code or UPC application may be operable to provide the user with the name of a product represented by a bar code, as well as other data relating to the product, such as price information, inventory information, or the like. An electronic document application could be incorporated to provide conversion between various electronic document formats. It is anticipated that the present invention will also encompass a variety of different computer software applications which may be utilized in the distributed computing environment of the present invention.

From the foregoing, it can be seen that the present invention provides a system and method for performing document recognition and processing in a distributed computing environment. In one embodiment, this is accomplished as document images are submitted by a user via a network for processing on remotely located computer software applications. In one particular embodiment the processing which is performed on a document is optical character recognition (OCR) processing. The results of the document processing by the computer software application located remotely from a user are then transferred back to the user via a network and may utilize various user preferences in transferring the document to the user. The present invention need not limit itself to the embodiments discussed herein. For example, numerous different data transfer protocols and numerous computer software applications for document recognition and processing may be implemented in the distributed computing environment of the present invention.

The presently disclosed embodiments are, therefore, considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. A distributed computing system for processing document data at a processing location remote from users, comprising:

a network server which receives documents transmitted to said processing location from at least one user terminal; and an application server connected to said network server to receive documents transmitted thereto, and which distributes a portion of said documents responsive to one or more document processing applications at said processing location which convert the received documents into one or more electronic document formats.

2. The distributed computing system of claim 1, wherein a converted document is transmitted to a user.

3. The distributed computing system of claim 1, wherein said network server receives documents from at least one computer operating one or more software applications.

4. The distributed computing system of claim 3, wherein said network server receives documents from at least one network browser.

5. The distributed computing system of claim 4, wherein the network used to transmit said document data comprises a Virtual Private Network (VPN).

6. The distributed computing system of claim 4, wherein said network server receives documents from at least one Internet browser.

7. The distributed computing system of claim 6, wherein said network server receives documents from at least one World Wide Web (WWW) browser.

8. The distributed computing system of claim 3, wherein said network server receives documents from at least one email application.

9. The distributed computing system of claim 3, wherein said network server receives documents from at least one scanner interface application.

10. The distributed computing system of claim 1, wherein said at least one user terminal comprises a facsimile machine.

11. The distributed computing system of claim 10, further including a facsimile server which receives documents from said facsimile machine and forwards them to a routing server, which transmits said documents to said application server.

12. The distributed computing system of claim 1, wherein said at least one user terminal comprises a scanner.

13. The distributed computing system of claim 12, wherein said application scanner interface receives said document data from said scanner.

14. The distributed computing system of claim 12, wherein said routing server receives said document data plus user ID data from said scanner interface.

15. The distributed computing system of claim 1, wherein said document data and user ID is transmitted over the Internet.

16. The distributed computing system of claim 1, wherein the network used to transmit said document data comprises a local area network (LAN).

17. The distributed computing system of claim 1, wherein the network used to transmit said document data comprises a wide area network (WAN).

18. The distributed computing system of claim 1, wherein the network used to transmit said document data comprises a virtual private network (VPN).

19. The distributed computing system of claim 1, wherein said application server stores user preferences to determine methods for transmitting said documents.

20. The distributed computing system of claim 2, wherein said application server stores user preferences which determine methods for transmitting said converted documents.

21. The distributed computing system of claim 20, wherein individual user preferences for processing documents are stored on an application server.

22. The distributed computing system of claim 1, wherein said one or more document processing applications comprise an optical character recognition (OCR) application.

23. The distributed computing system of claim 1, wherein said one or more document processing applications comprise a handwriting recognition application.

24. The distributed computing system of claim 1, wherein said one or more document processing applications comprise a logical structure recognition (LSR) application.

25. The distributed computing system of claim 1, wherein said one or more document processing applications comprise a bar code application.

26. The distributed computing system of claim 1, wherein said one or more document processing applications comprise a UPC application.

27. The distributed computing system of claim 1, wherein said one or more document processing applications comprise an inventory application.

28. The distributed computing system of claim 1, wherein said one or more document processing applications comprise a price maintaining application.

29. The distributed computing network of claim 1, wherein said one or more document processing applications reside on a single server.

30. The distributed computing network of claim 1, wherein said one or more document processing applications reside on multiple servers.

31. The distributed computing system of claim 1, wherein said one or more document processing applications comprise a rendering application.

32. The distributed computing system of claim 31, wherein said rendering application comprises a dynamic document rendering application.

33. The distributed computing system of claim 32, wherein said dynamic document rendering application comprises a markup language document rendering application.

34. The distributed computing system of claim 33, wherein said markup language document rendering application comprises a Hypertext Markup Language (HTML) document rendering application.

35. The distributed computing system of claim 34, wherein said rendering application comprises a document format rendering application.

36. A method for remote document processing using a distributed computing system, comprising the steps of:
   receiving one or more documents to be processed from users at one or more remote terminals at a network server;
   processing said one or more documents using at least one document processing application located remotely from said one or more users to create one or more processed documents;
   transmitting said one or more processed documents to one or more users via said network server; and
   distributing said one or more documents from an application server to one or more servers running said at least one document processing applications.

37. The method of claim 36, wherein said step of submitting comprises submitting documents via a network browser.

38. The method of claim 36, wherein said step of submitting comprises submitting documents using an email application.

39. The method of claim 36, wherein said step of submitting comprises submitting documents using an scanner interface application.

40. The method of claim 36, wherein said step of submitting comprises submitting documents using a facsimile machine.

41. The method of claim 39, wherein said step of submitting documents using a facsimile machine further comprises transmitting data from said facsimile machine to a facsimile server, which transmits the data to a routing server, which transmits the data to an application server.

42. The method of claim 36, wherein said step of submitting comprises submitting documents via a scanner.

43. The method of claim 42, wherein said step of submitting documents via a scanner comprises transmitting scanner data to a scanner interface application which transmits data to a network server or routing server via a network.

44. The method of claim 43, wherein said step of submitting documents via a scanner comprises transmitting data from said scanner interface application server to a routing server via a network.

45. The method of claim 36, wherein said step of submitting comprises submitting user authentication information.

46. The method of claim 36, wherein said step of submitting comprises submitting user identification information.

47. The method of claim 46, wherein said step of submitting user identification information comprises submitting caller ID information.

48. The method of claim 46, wherein said step of submitting user identification information comprises submitting facsimile ID string information.

49. The method of claim 46, wherein said step of submitting user identification comprises submitting a cover sheet containing user identification information.

50. The method of claim 49, wherein said step of submitting a cover sheet containing user identification information comprises submitting a barcode representing user identification information.

51. A method of claim 49, wherein said step of submitting a cover sheet containing user identification information comprises identifying user identification information from said cover sheet using OCR techniques.

52. The method of claim 36, wherein said step of processing comprises performing OCR processing.

53. The method of claim 36, wherein said step of processing comprises performing handwriting recognition processing.

54. The method of claim 36, wherein said step of processing comprises performing LSR processing.

55. The method of claim 36, wherein said step of processing comprises performing document conversion processing.

56. The method of claim 36, wherein said step of processing comprises performing bar code recognition processing.

57. The method of claim 36, wherein said step of processing comprises performing UPC recognition processing.

58. The method of claim 36, wherein said step of processing comprises performing price processing.

59. The method of claim 36, wherein said step of processing comprises performing inventory processing.

60. The method of claim 36, wherein said step of processing comprises performing document rendering processing.

61. The method of claim 36, wherein said step of processing is performed according to predetermined user preferences.

62. The method of claim 36, wherein said step of transmitting is performed according to predetermined user preferences.

63. The method of claim 36, wherein said step of controlling is performed according to predetermined user preferences.

64. A computer readable medium containing a computer program which executes the steps of:
  receiving one or more documents to be processed from users at one or more remote terminals at network servers;
  processing said one or more documents using document processing applications located on said one or more remote terminals to create one or more processed documents;
  transmitting said one or more processed documents to one or more users via said networks server; and
  distributing said one or more documents from an application server to one or more servers running at one said document processing applications.

65. A distributed computing system for processing documents at a processing location remote from users, comprising:
  means for submitting one or more documents to be processed using one or more remote terminals via a network server;
  means for processing said one or more documents using document processing applications located on said one or more remote terminals to create one or more processed documents;
  means for transmitting said one or more processed documents to said one or more users via said network server;
  means for distributing said one or more documents to said one or more remote terminals.

* * * * *

UNITED STATES PATENT AND TRADEMARK OFFICE
CERTIFICATE OF CORRECTION

PATENT NO. : 6,742,161 B1
APPLICATION NO. : 09/520892
DATED : May 25, 2004
INVENTOR(S) : Barnaby James et al.

It is certified that error appears in the above-identified patent and that said Letters Patent is hereby corrected as shown below:

In Col. 8, line 44
replace "said documents responsive to one"
with "said documents to one"

In Col. 10, line 30
replace "document processing applications."
with "document processing application."

In Col. 12, line 19
replace "one or more servers running at one said"
with "one or more servers running at least one said"

In Col. 12, line 20
replace "document processing applications."
with "document processing application."

Signed and Sealed this

Fourteenth Day of April, 2009

JOHN DOLL
*Acting Director of the United States Patent and Trademark Office*